(12) United States Patent
Zheng

(10) Patent No.: US 7,474,751 B2
(45) Date of Patent: Jan. 6, 2009

(54) METHOD OF SELECTING ENCRYPTING ARITHMETIC FOR REALIZING COMMUNICATION OF SECRECY

(75) Inventor: Zhibin Zheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 965 days.

(21) Appl. No.: 10/498,334

(22) PCT Filed: Mar. 29, 2002

(86) PCT No.: PCT/CN02/00223

§ 371 (c)(1),
(2), (4) Date: Jun. 11, 2004

(87) PCT Pub. No.: WO03/050988

PCT Pub. Date: Jun. 19, 2003

(65) Prior Publication Data

US 2005/0047597 A1    Mar. 3, 2005

(30) Foreign Application Priority Data

Dec. 13, 2001    (CN) .............................. 01 1 44225

(51) Int. Cl.
*H04K 1/00* (2006.01)
*H04M 1/66* (2006.01)
(52) U.S. Cl. ..................................... 380/270; 455/410
(58) Field of Classification Search ................ 380/270; 455/410
See application file for complete search history.

(56) References Cited

U.S. PATENT DOCUMENTS

| | | | |
|---|---|---|---|
| 6,556,820 B1 * | 4/2003 | Le et al. ..................... | 455/411 |
| 6,763,112 B1 * | 7/2004 | Haumont ..................... | 380/247 |
| 7,046,992 B2 * | 5/2006 | Wallentin et al. ........... | 455/411 |
| 7,362,866 B2 * | 4/2008 | Zheng ......................... | 380/270 |
| 2002/0066011 A1 * | 5/2002 | Vialen et al. ................ | 713/150 |
| 2003/0100291 A1 * | 5/2003 | Krishnarajah et al. ....... | 455/410 |

(Continued)

FOREIGN PATENT DOCUMENTS

CN    1282498    1/2001

(Continued)

OTHER PUBLICATIONS

International Search Report for PCT/CN02/00223 mailed Oct. 3, 2002, ISA/210 (China).

*Primary Examiner*—Kambiz Zand
*Assistant Examiner*—Teshome Hailu

(57) ABSTRACT

A method for implementing security communication. A bit for representing CI is added, and a judge process for the CI and encryption algorithm supported by both the current subscriber and network is added. If the CN supports more than one encryption algorithm, if the CI is 1 and a standard encryption algorithm is supported by both UE and CN, the standard encryption algorithm is determined as the encryption algorithm for security communication: otherwise, the communication is disconnected; if the CI is 0 and a self-developed non-standard encryption algorithm is supported by both UE and CN, the encryption algorithm is determined as the encryption algorithm for security communication; otherwise, the communication is disconnected. If the CN only supports the standard encryption algorithm, if this algorithm is also supported by UE, this standard encryption algorithm is determined as the encryption algorithm for security communication directly; otherwise, the communication is disconnected.

7 Claims, 2 Drawing Sheets

U.S. PATENT DOCUMENTS

| | | | |
|---|---|---|---|
| 2004/0017798 A1* | 1/2004 | Hurtta et al. | 370/352 |
| 2004/0029587 A1* | 2/2004 | Hulkkonen et al. | 455/436 |
| 2004/0105429 A1* | 6/2004 | Anckar et al. | 370/352 |
| 2004/0157600 A1* | 8/2004 | Stumpert et al. | 455/432.1 |
| 2004/0185829 A1 | 9/2004 | Vinck | |
| 2004/0185884 A1* | 9/2004 | Marin et al. | 455/466 |
| 2005/0078828 A1* | 4/2005 | Zheng | 380/270 |
| 2005/0254469 A1* | 11/2005 | Verma et al. | 370/338 |
| 2007/0105543 A1* | 5/2007 | Rajaniemi et al. | 455/422.1 |

FOREIGN PATENT DOCUMENTS

| | | |
|---|---|---|
| WO | WO 9933299 | 7/1999 |
| WO | 00/36860 | 6/2000 |
| WO | 01/35691 A1 | 5/2001 |

* cited by examiner

METHOD OF SELECTING ENCRYPTING ARITHMETIC FOR REALIZING COMMUNICATION OF SECRECY

FIELD OF THE TECHNOLOGY

The present invention relates to security communication technology in the 3rd Generation (3G) system, and more particularly to a method for implementing security communication between both communication sides by independently determining and selecting an encryption algorithm supported by both the terminal side and the network side.

BACKGROUND OF THE INVENTION

At present, in all kinds of communication systems and particularly in mobile communication systems, the implementation of security communication is of great importance for guaranteeing security of information transmitted between subscribers. Therefore, it is necessary to protect the data being transmitted with encryption. Generally, encrypting the data for protection means an encryption algorithm is adopted by both the communication sides. The transmit side encrypts the data to be transmitted with a selected encryption algorithm and then transmits the encrypted data, which is decrypted with the selected algorithm after being received by the receive side.

In the prior 3rd Generation Wideband Code Division Multiple Access (3G WCDMA) mobile communication system, encryption protection can be used during the information transmission process between a User Equipment (UE) and the access network, namely between UE and the UMTS Terrestrial Radio Access Network (UTRAN). In this security communication process, the algorithm adopted by both sides is stored in UE and Radio Network Controller (RNC) of the access network respectively. Actually, the RNC stores the encryption algorithms supported by the Core Network (CN). The selection of encryption algorithm is implemented through comparing the algorithms supported by UE and the available algorithms designated by CN with the RNC. Since each encryption algorithm corresponds to one single identifier for User Encryption Algorithm (UEA), the RNC determines an encryption algorithm through comparing the UEAs. According to prescription of the prior WCDMA standard, a UEA occupies 4 bits, in which "0000" is defined as no encryption and "0001" is defined as standard KASUMI encryption algorithm. The other 14 values are undefined and can be used as reservation UEAs for self-defining usage.

As is shown in FIG. 1, the specific implementing process of the prior encryption protection is as follows.

1) Firstly, a Radio Resource Control (RRC) connection is established. Then UE sends the security information to the access network after the successful connection.

When a subscriber is calling or is being called, the high layer of UE will notify the access layer to establish a RRC connection, in more detail, to establish a RRC connection between UE and RNC of the access network. After the successful connection, UE sends its security capability information to RNC of the access network by way of a RRC CONNECTION COMPLETE message. RNC stores relevant security information including the UEAs supported by UE.

2) CN initiates establishment of security mode.

When CN initiates establishment of security mode, the Visiting Location Register (VLR) of CN determines which UEA shall be selected for use and sends RNC a SECURITY MODE COMMAND message carrying the UEAs and Cipher Key (CK).

3) RNC processes the received SECURITY MODE COMMAND.

RNC selects a UEA according to the received UEAs and the stored UEAs supported by UE. Then RNC sends UE a SECURITY MODE COMMAND message carrying the selected UEA.

4) The process after UE receives SECURITY MODE COMMAND is implemented.

After receiving SECURITY MODE COMMAND, UE sets the local UE security capability parameter as the received UE security capability parameter. Meanwhile UE sends SECURITY MODE COMPLETE message to RNC of the access network, which means the security mode has been successfully set.

5) Access network receives SECURITY MODE COMPLETE message.

After receiving the SECURITY MODE COMPLETE message, RNC of the access network sends the SECURITY MODE COMPLETE message, which carries the selected UEA, to the VRL of CN.

6) The process of encryption protection is completed.

After receiving SECURITY MODE COMPLETE message, VLR of CN completes setting of its own security mode and then waits until the predetermined time is due, after which security communication between UE and UTRAN begins. During this communication, the encryption algorithm corresponding to the selected UEA is employed to encrypt or decrypt data.

Due to the particularity of password application and in consideration of the information safeness and security of one's country or network, different countries or service providers prefer to use their individual encryption algorithms respectively in order to prevent uncertain loss which results from the ease of decrypting the password. Thus, besides the standard encryption algorithm, those countries or service providers needing private encryption algorithms can select one of the 14 reserved UEAs as the identifier of their independent and self-developed encryption algorithm. Thus, the system may support two encryption algorithms. In the communication procedure, if more than one encryption algorithm is available, the service providers tend to designate the one more suitable to the present situation than others. For instance, if the two subscribers in the same country both support standard encryption algorithm and domestic encryption algorithm, the latter shall be designated for domestic communication in priority; if the two parts have no the same encryption algorithm while security communication is required by CN, normal communication cannot be realized between UEs.

However, since there is no unified prescription concerning use of the reserved UEAs, every country or service provider can choose any one of the reserved UEAs. So, the problem of encryption algorithm identifier conflict may occur during the roaming of mobile subscribers. For example, a Chinese service provider selects "0010" as domestic UEA while an American service provider also selects "0010" as domestic UEA. The two "0010" correspond to different encryption algorithms despite of the same value. Then, when a subscriber of a Chinese service provider roams to America and the encryption algorithms are consulted, a normal connection will be established between both parts because of their equal UEA value, but normal communication cannot be realized because of different encryption algorithms.

SUMMARY OF THE INVENTION

Therefore, a main object of the present invention is to provide a method for implementing security communication by independently selecting an encryption algorithm, which enables the subscriber to perform security communication utilizing effective encryption algorithm anywhere and satisfies the requirement for independently selecting encryption algorithm in local area. Accordingly, the subscriber interest and service quality is guaranteed.

To achieve the above-mentioned object, the specific technical scheme of this invention is as follows.

A method for implementing security communication by independently selecting an encryption algorithm, comprising:

a. when a subscriber is calling or is being called, the Core Network (CN) extracting Mobile Country Code (MCC) of the subscriber and according to said MCC setting value of Customer Identifier (CI) to indicate whether the subscriber is a foreign or domestic subscriber;

b. establishing a connection between User Equipment (UE) corresponding to the subscriber and Radio Resource Controller (RRC), after the connection is successfully established, the UE sending a message of RRC connection completion to RNC of the access network, the RNC then storing relevant security information in said message including User Encryption Algorithms (UEAs) supported by the UE;

c. when CN initiating establishment procedure of security mode, a Visit Location Register (VLR) of CN selecting at least one UEA, and sending RNC a security mode command message including UEAs, Cipher Key (CK) and CI information;

d. after receiving the security mode command message from CN, RNC selecting a UEA for security communication according to the selected UEAs in CN in said message and the stored UEAs supported by the UE;

under the condition that CN supports more than one encryption algorithm, if the current subscriber is a foreign subscriber and a standard encryption algorithm is supported by both UE and CN, determining the standard encryption algorithm as the encryption algorithm for security communication; otherwise, determining that no appropriate encryption algorithm is available and disconnecting the communication; if the current subscriber is a domestic subscriber and is a non-standard encryption algorithm is supported by both UE and CN, determining this encryption algorithm as the encryption algorithm for security communication; otherwise, determining that no appropriate encryption algorithm is available and disconnecting the communication;

under the condition that CN only supports the standard encryption algorithm, if this algorithm is also supported by UE, determining this standard encryption algorithm as the encryption algorithm for security communication directly; otherwise, determining that no appropriate encryption algorithm is available and disconnecting the communication;

after selecting UEA, RNC sending UE a security mode command message carrying the selected UEA;

e. after receiving the security mode command message, UE setting the local UE security capability parameter as the received UE security capability parameter, meanwhile, UE sending a security mode complete message to RNC of the access network; after receiving the message, RNC sending a security mode complete message carrying the selected UEA to VLR of CN; the VLR of CN completing setting of its own security mode after receiving the security mode complete message.

The method may further comprise: presetting a Mobile Country Code (MCC) number list and storing the list in CN, regarding the subscribers according with said list as domestic subscribers and regarding the subscribers not according with said list as foreign subscribers.

In addition, the method may further comprise: storing the MCCs of foreign subscribers in the MCC number list whose encryption algorithm is the same as that of the domestic subscribers. Moreover, the Cl value can be set to 0 if the current subscriber is judged as a domestic subscriber based on MCC, and to 1 if the current subscriber is judged as a foreign subscriber based on MCC.

The length of Cl can be 1 bit.

From the technical scheme described above, it can be seen that the key point of this invention lies in: a CI is added, and judgment for CI and judgment for encryption algorithms supported by the current subscriber and the network is also added. If a subscriber is a domestic subscriber and both the subscriber and network support the standard encryption algorithm, or if the subscriber is a foreign subscriber and both the subscriber and network support a self-developed encryption algorithm other than the standard encryption algorithm, normal security communication can be implemented; otherwise, security communication is unavailable.

Accordingly, this method for implementing security communication by independently selecting an encryption algorithm provided by this invention has the following advantages and characteristics:

1) The method according to the present invention not only satisfies the requirement of adopting private encryption algorithm for domestic security communication, but also ensures that security communication is available for the roaming subscribers by supporting standard encryption algorithm. The problem of abnormal security communication because of conflict between encryption algorithms when the mobile subscriber is roaming around is wholly resolved. Furthermore, better service can be provided for the subscribers.

2) Although the step of extracting MCC of UE by CN is newly added, no additional performance overhead is added because CN must extract MCC of UE originally.

3) Although the parameter CI is added in the SECURITY MODE COMMAND message sent to RNC from CN via Iu interface, it hardly affects the implementation of devices because this parameter occupies extremely few bits.

4) Although additional selecting judgment is added after RNC receives SECURITY MODE COMMAND via Iu interface, the design for judgment is simple and easily implemented. Furthermore, the application of system in which only standard encryption algorithm is adopted is seldom affected.

DETAILED DESCRIPTION OF THE INVENTION

Now, the present invention will be described in detail with reference to the accompanying drawings.

To select an encryption algorithm for communication between two sides, it is necessary for RNC to compare encryption algorithms supported by UE and those supported by CN. In order to avoid conflict due to different encryption algorithms during roaming process, judgment for all kinds of possible situations and corresponding choice of encryption algorithm should be added in this comparing process. As information about the country or service provider to which the current subscriber belongs is necessary for judging all kinds of possible situations, an identifier for identifying the country or service provider to which the subscriber belongs is added in the message sending to the access network from CN. RNC can determine the encryption algorithm to be employed according to this identifier and the encryption algorithm supported by the current UE.

The precondition to realize the method according to the present invention is that both UE and network support standard encryption algorithm meanwhile encryption is required by the network, namely, UEA is not "0000". In addition, if domestic algorithm is requested, RNC must judge whether the subscriber is a domestic subscriber or a foreign one according to the subscriber identifier, and choose an appropriate encryption algorithm based on the judgment. Moreover, if both standard encryption algorithm and domestic self-developed encryption algorithm are simultaneously supported by the CN, the latter must be adopted for domestic security communication.

Figure 1:
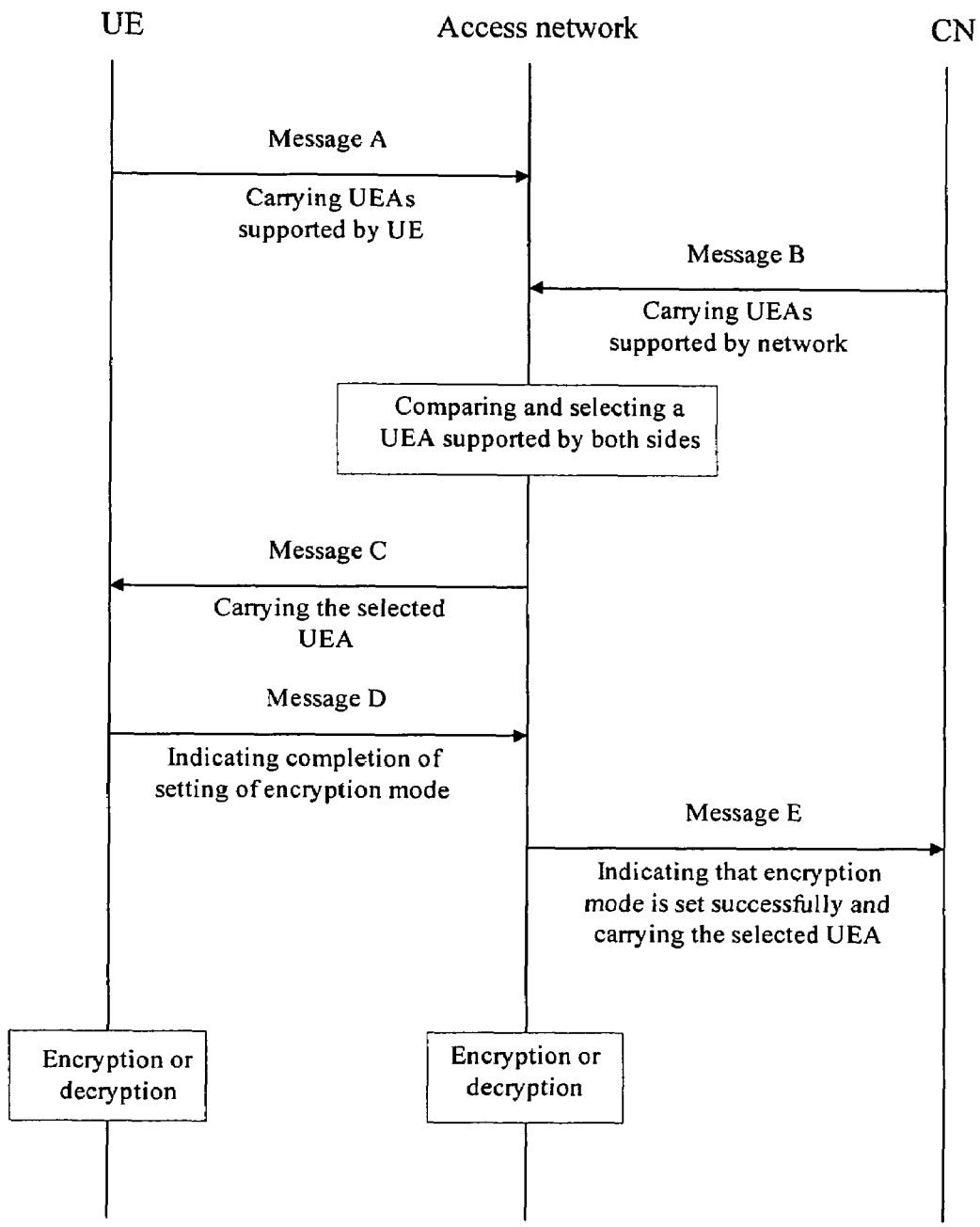
FIG. 1 is a signaling flow chart of determining an encryption algorithm in prior art.
Figure 2:
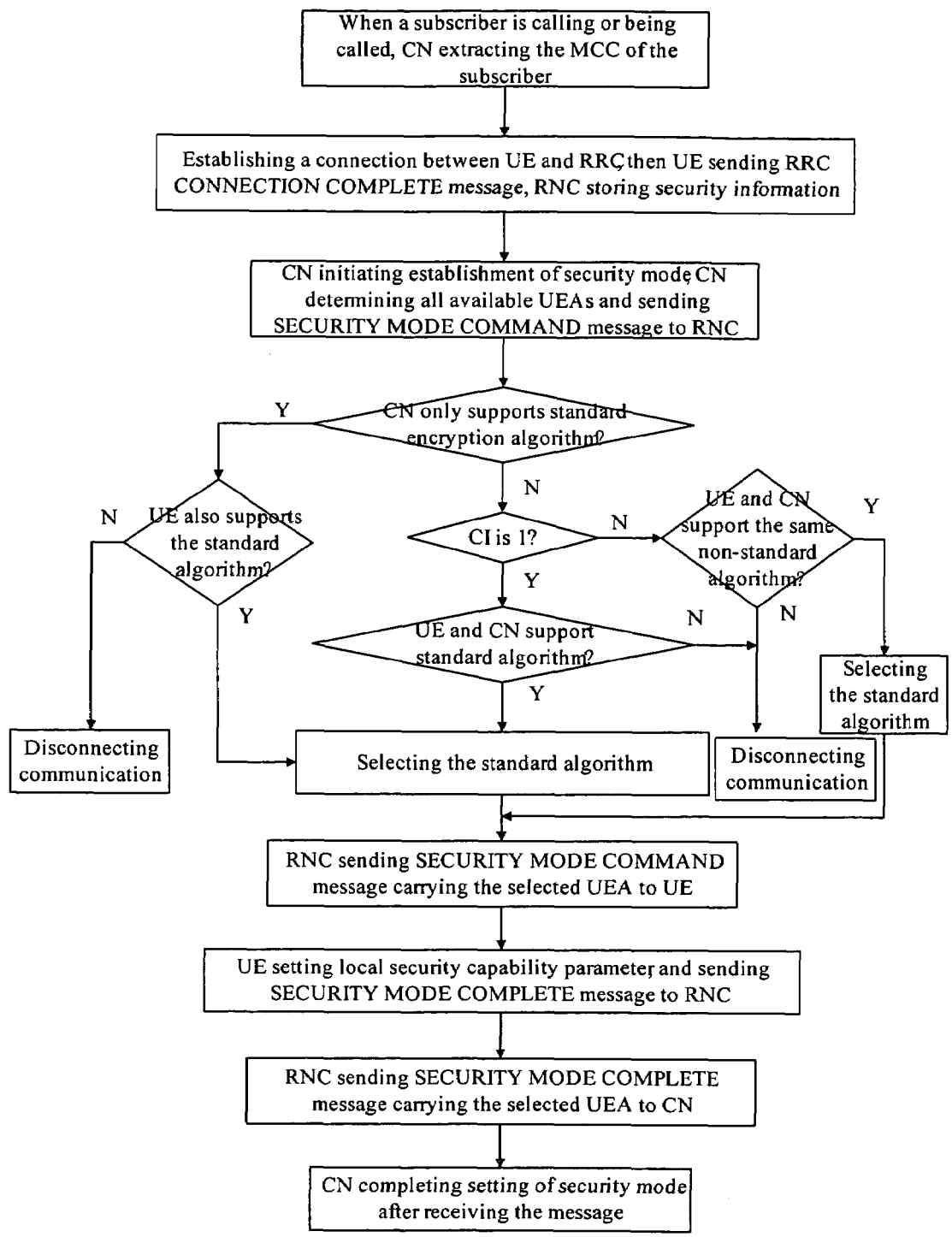
FIG. 2 is a flow chart illustrating the method for determining an encryption algorithm according to the present invention.

With reference to FIG. 2, a specific implementing process of method according to the present invention at least comprises the following steps.

1) When a subscriber is calling or is being called, CN extracts MCC of this subscriber and then judges whether the subscriber is a domestic subscriber or a foreign one.

2) High layer of UE will notify the access network to establish a RRC connection for this subscriber, namely to establish a RRC connection between UE and RNC. After the connection is successfully established, UE sends its security capability information to the RNC through RRC CONNECTION COMPLETE message indicating the connection has been successfully established. RNC stores relevant security information including UEAs supported by the UE.

3) When CN initiates establishment of security mode, the VLR of CN determines which UEA shall be selected for use and sends RRC a SECURITY MODE COMMAND message including UEAs, CK and the new added CI information. In this embodiment the length of CI is set at 1 bit. Certainly, the length of CI can be set at more bits according to practical application. CI is set at 0 if the current subscriber is determined as a domestic subscriber according to the MCC of the subscriber, and at 1 if a foreign subscriber.

4) After receiving SECURITY MODE COMMAND message, the RNC selects a UEA for security communication according to the received UEAs and the stored UEAs supported by the UE. This selection process includes the following two instances.

a. If CN supports more than one encryption algorithm, the primary two instances are as follows:

a1. When value of the received CI equals 1 and if both UE and CN support standard encryption algorithm signed as "0001", this standard encryption algorithm is selected as the encryption algorithm for security communication; otherwise no appropriate encryption algorithm is assumed available and the communication connection is disconnected.

a2. When value of the received CI equals 0 and if both UE and CN support a standard encryption algorithm other than the one signed as "0001", this encryption algorithm is selected for security communication; otherwise no appropriate encryption algorithm is assumed available and the communication connection is disconnected.

Under the instance of a1, if the current subscriber is a foreign subscriber but the country or service provider to which the subscriber belongs adopts the same encryption algorithm as that of the roaming location for security communication. For example, China uses "0011" to identify the corresponding algorithm, and Country M is China's neighboring country, M may directly adopt the encryption algorithm which is adopted by China to avoid trouble of self-developing. Thus, when a subscriber of Country M is roaming in China, normal security communication is available. But according to the instance of a1, this communication cannot be supported. To avoid this condition, MCC can be processed in CN. For instance, a MCC number list can be set and stored in CN beforehand. This list includes MCCs of foreign countries adopting the same encryption algorithm as that in the homeland. Before setting the value of CI, MCC number list is searched. Those according with the list are assumed domestic subscribers and the value of relevant CI is set at "0"; those not according with the list are assumed foreign subscribers and the value of relevant CI is set at "1".

b. If CN only supports standard encryption algorithm, namely, the SECURITY MODE COMMAND message sent from CN only includes one encryption algorithm identified as "0001", and UE also supports this algorithm, then judgment of CI is not needed and standard encryption algorithm is directly adopted for security communication.

After UEA is selected, RNC sends UE a SECURITY MODE COMMAND message carrying the selected UEA.

5) After receiving SECURITY MODE COMMAND message, UE sets local UE security capability parameter as the received UE security capability parameter. Meanwhile UE sends a SECURITY MODE COMPLETE message to RNC of the access network, indicating the successful setting of security mode.

6) After receiving SECURITY MODE COMPLETE message, RNC of the access network immediately sends VLR of CN a SECURITY MODE COMPLETE message carrying the selected UEA.

7) After receiving SECURITY MODE COMPLETE message, VLR of CN completes setting of its own security mode and then waits until the predetermined time is due, after which security communication between UE and UTRAN begins. This communication is encrypted or decrypted according to the encryption algorithm corresponding to the selected UEA.

The invention claimed is:

1. A method for implementing security communication by independently selecting an encryption algorithm, comprising:
   a. when a subscriber is calling or is being called, the Core Network (CN) extracting Mobile Country Code (MCC) of the subscriber and according to said MCC setting value of Customer Identifier (CI) to indicate whether the subscriber is a foreign or domestic subscriber;
   b. establishing a connection between User Equipment (UE) corresponding to the subscriber and Radio Resource Controller (RRC), after the connection is successfully established, the UE sending a message of RRC connection completion to RNC of the access network, the RNC then storing relevant security information in said message including User Encryption Algorithms (UEAs) supported by the UE;
   c. when CN initiating establishment procedure of security mode, a Visit Location Register (VLR) of CN selecting at least one UEA, and sending RNC a security mode command message including UEAs, Cipher Key (CK) and CI information;
   d. after receiving the security mode command message from CN, RNC selecting a UEA for security communication according to the selected UEAs in CN in said message and the stored UEAs supported by the UE;
   where CN supports more than one encryption algorithm, if the current subscriber is a foreign subscriber and a standard encryption algorithm is supported by both UE and CN, determining the standard encryption algorithm as the encryption algorithm for security communication; otherwise, determining that no appropriate encryption algorithm is available and disconnecting the communication; if the current subscriber is a domestic subscriber and a non-standard encryption algorithm is supported by both UE and CN, determining this encryption algorithm as the encryption algorithm for security communication; otherwise, determining that no appropriate encryption algorithm is available and disconnecting the communication;

where CN only supports the standard encryption algorithm, if the standard encryption algorithm is also supported by UE, determining the standard encryption algorithm as the encryption algorithm for security communication directly; otherwise, determining that no appropriate encryption algorithm is available and disconnecting the communication;

after selecting UEA, RNC sending UE a security mode command message carrying the selected UEA;

e. after receiving the security mode command message, UE setting the local UE security capability parameter as the received UE security capability parameter, meanwhile, UE sending a security mode complete message to RNC of the access network; after receiving the message, RNC sending a security mode complete message carrying the selected UEA to VLR of CN; the VLR of CN completing setting of its own security mode after receiving the security mode complete message.

2. The method of claim 1, further comprising: presetting a Mobile Country Code (MCC) number list and storing the list in CN, wherein the MCC number list is for determining whether a subscriber is a domestic subscriber or a foreign subscriber.

3. The method of claim 2, further comprising: storing the MCCs of foreign countries in the MCC number list whose encryption algorithm is the same as that of the domestic subscribers.

4. The method of claim 3, wherein the setting value of CI comprises: setting CI value to 0 if determining the current subscriber is a domestic subscriber based on MCC, or setting CI value to 1 if determining the current subscriber is a foreign subscriber based on MCC.

5. The method of claim 4, wherein the length of CI is 1 bit.

6. The method of claim 2, wherein the setting value of CI comprises setting CI value to 0 if determining the current subscriber is a domestic subscriber based on MCC, or setting CI value to 1 if determining the current subscriber is a foreign subscriber based on MCC.

7. The method of claim 6, wherein the length of CI is 1 bit.

* * * * *